(12) United States Patent
Huang-Fu et al.

(10) Patent No.: US 10,863,390 B2
(45) Date of Patent: Dec. 8, 2020

(54) METHOD AND APPARATUS FOR NON-ACCESS STRATUM TRANSPORT

(71) Applicant: MEDIATEK INC., Hsinchu (TW)

(72) Inventors: Chien-Chun Huang-Fu, Hsinchu (TW); Marko Niemi, Oulu (FI)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/274,993

(22) Filed: Feb. 13, 2019

(65) Prior Publication Data

US 2019/0254089 A1    Aug. 15, 2019

Related U.S. Application Data

(60) Provisional application No. 62/630,803, filed on Feb. 14, 2018.

(51) Int. Cl.
*H04W 76/12* (2018.01)
*H04W 36/00* (2009.01)
(Continued)

(52) U.S. Cl.
CPC ....... *H04W 36/0016* (2013.01); *H04W 36/14* (2013.01); *H04W 76/12* (2018.02); *H04W 76/32* (2018.02); *H04W 84/042* (2013.01)

(58) Field of Classification Search
CPC . H04W 36/0016; H04W 36/14; H04W 76/12; H04W 76/32; H04L 65/1016; H04L 29/06
See application file for complete search history.

(56) References Cited

U.S. PATENT DOCUMENTS

2015/0257173 A1* 9/2015 You .................. H04L 1/1864
                                                    370/330
2016/0226922 A1* 8/2016 Russell ............... H04L 65/1016
(Continued)

FOREIGN PATENT DOCUMENTS

CN     101765085 A    6/2010
CN     102651902 A    8/2012

OTHER PUBLICATIONS

Combined Taiwanese Office Action and Search Report dated Nov. 26, 2019 in Patent Application No. 108104918 (with English translation of categories of cited documents), 8 pages.
(Continued)

*Primary Examiner* — Wei Zhao
(74) *Attorney, Agent, or Firm* — Oblon, McClelland, Maier & Neustadt, L.L.P.

(57) ABSTRACT

Aspects of the disclosure can provide an apparatus and method for communicating with core network of a fifth generation system. The method includes transmitting, by a processing circuitry of a user equipment, a non-access stratum transport message to the core network to initiate a non-access stratum transport procedure with the core network, and receiving an indication message from the core network when a network function of the core network is unable to process the non-access stratum transport message, wherein the indication message includes at least one of a payload type, a cause value, and timer information. When the payload type of the indication message is a fifth generation system session management message, a short message service message or a long term evolution positioning protocol message, the processing circuitry of the user equipment performs at least one of: re-initiating a non-access stratum transport procedure based on timer information,
(Continued)

aborting the non-access stratum transport procedure, and releasing a protocol data unit session.

17 Claims, 6 Drawing Sheets

(51) Int. Cl.
*H04W 36/14* (2009.01)
*H04W 76/32* (2018.01)
*H04W 84/04* (2009.01)

(56) References Cited

U.S. PATENT DOCUMENTS

2018/0007720 A1    1/2018  Shu et al.
2018/0227826 A1*   8/2018  Abraham .............. H04W 68/02

OTHER PUBLICATIONS

International Search Report and Written Opinion dated May 17, 2019 in PCT/CN2019/075021 filed Feb. 14, 2019, 9 pages.

"5G SM transport—AMF unable to forward SM message towards SMF," 3GPP TSG-CT WG1 Meeting #108, C1-180017, Jan. 26, 2017, pp. 1-7.

3$^{rd}$ Generation Partnership Project; Technical Specification Group Core Network and Terminals; Non-Access-Stratum (NAS) protocol for 5G System (5GS); Stage 3 (Release 15), 3GPP TS 24.501, Vo. 3.1, Feb. 9, 2018, pp. 1-224.

* cited by examiner

METHOD AND APPARATUS FOR NON-ACCESS STRATUM TRANSPORT

INCORPORATION BY REFERENCE

This present disclosure claims the benefit of U.S. Provisional Application No. 62/630,803, "UE Mechanism on NAS Transport Unroutable" filed on Feb. 14, 2018, which is incorporated herein by reference in its entirety.

TECHNICAL FIELD

The present disclosure relates to wireless communications, and specifically relates to non-access stratum (NAS) procedures in the fifth generation (5G) system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The wireless communications network has grown exponentially over the years. The $3^{rd}$ generation partnership project (3GPP), which has developed the most successful standard technologies in wireless communication market such as universal mobile telecommunication system (UMTS) and long term evolution (LTE), is currently carrying out the standardization of the fifth generation (5G) system, which includes a core network and an access network. The 5G core network is designed based on a service-based architecture, which is a style of software design where services are provided to the other components by application components, through a communication protocol over a network. The service-based architecture can minimize the dependencies between the core network and the access network, so that the core network may integrate different access types, e.g., 3GPP access and non-3GPP access.

The core network of the 5G system can include multiple network functions (NFs), such as Access and Mobility Management Function (AMF), Session Management Function (SMF), Short Message Service Function (SMSF), Location Management Function (LMF), and User Plane Function (UPF). These NFs can interact with each other by using a reference point.

Non-access stratum (NAS) is a functional layer in the 5G system between a user equipment (UE) and a core network of the 5G system. The UE can initiate a NAS transport procedure to the core network and interact with different NFs. Specifically, the UE can establish a NAS transport connection to the AMF of the core network, and transmit a NAS transport message to the AMF across the NAS transport connection. The NAS transport message can include the payload messages intended for other NFs, and the AMF can further forward the payload messages towards the corresponding NFs, e.g., SMF, SMSF, and LMF. In some examples, the AMF of the core network may be unable to process the NAS transport message. Then the AMF of the core network should indicate the failure of NAS transport procedure to the UE and the UE can react appropriately to the failed NAS transport procedure.

SUMMARY

Aspects of the disclosure provide a method to communicate with a core network of a fifth generation (5G) system. The method includes transmitting a non-access stratum (NAS) transport message from a user equipment (UE) to the core network in order to initiate a NAS transport procedure with the core network, receiving an indication message from the core network when a network function of the core network is unable to process the NAS transport message, wherein the indication message includes at least one of a payload type, a cause value, and timer information, and performing, by the processing circuitry of the UE, at least one of: re-initiating a NAS transport procedure based on timer information, aborting the NAS transport procedure, and releasing a protocol data unit (PDU) session.

In an embodiment, the payload type of the NAS transport message includes as least one of: a 5G system session management (5GSM) message, a short message service (SMS) message, and a long term evolution (LTE) positioning protocol (LPP) message.

In an embodiment, when the payload type of the indication message is either the SMS message or the LPP message, then the processing circuitry of the UE performs at least one of: re-initiating a NAS transport procedure based on timer information, and aborting the NAS transport procedure.

In an embodiment, the network functions of the core network include: an Access and Mobility Management Function (AMF), a Session Management Function (SMF), a SMS Function (SMSF), and a Location Management Function (LMF).

In an embodiment, network functions of the core network are unable to process the NAS transport message when the AMF is unable to transmit the 5GSM message to the SMF, to transmit the SMS message to the SMSF, or to transmit the LPP message to the LMF.

In an embodiment, re-initiating the NAS transport procedure is based on the timer that is indicated from the core network signaling, a default timer, or a standardized timer.

In an embodiment, releasing the protocol data unit (PDU) session, further comprises releasing an existing connection to a data network that provides Internet access or operator services to the UE, and optionally re-establishing a new connection to the data network after a timer expires, after the UE is switched off, after the UE's universal subscriber identity module (USIM) is removed, or after the UE registers to a new public land mobile network (PLMN).

In an embodiment, aborting the NAS transport procedure, further comprises terminating a current 5GSM, SMS or LPP message transport procedure after a timer expires, after the UE is switched off, after the UE's universal subscriber identity module (USIM) is removed, or after the UE registers to a new public land mobile network (PLMN).

In an embodiment, the timer information includes a timer type and a timer value, and the timer type includes at least one of a re-attempt timer and a back-off timer.

In an embodiment, the cause values that are generated from the core network, include the 5G system mobility management (5GMM) cause code #65 corresponding to "maximum number of PDU sessions reached", #90 corresponding to "payload was not forwarded", #22 corresponding to "congestion", #67 corresponding to "insufficient resources for specific slice and data network name", #69 corresponding to "insufficient resources for specific slice", #91 corresponding to "Data Network Name (DNN) not supported or not subscribed in the slice", and #28 corresponding to "restricted service area".

Aspects of the disclosure further provide user equipment for communicating with a core network, comprising a transceiver configured to communicate with the core network, and processing circuitry that is configured to: transmit via the transceiver a NAS transport message to a core network to initiate a NAS transport procedure with the core network, and receive an indication message from the core network when a network function of the core network is unable to process the NAS transport message, wherein the indication message includes at least one of a payload type, a cause value, and timer information. The processing circuitry is further configured to perform at least one of: re-initiating a NAS transport procedure based on timer information, aborting the NAS transport procedure, and releasing a PDU session.

Aspects of the disclosure further provide a non-transitory computer readable medium storing instructions which, when executed by a processor, cause the processor to perform a method for: transmitting, by a processing circuitry of a UE, a NAS transport message to the core network to initiate a NAS transport procedure with the core network, receiving an indication message from the core network when a network function of the core network is unable to process the NAS transport message, wherein the indication message includes at least one of a payload type, a cause value, and timer information, and performing, by the processing circuitry of the UE, at least one of: re-initiating a NAS transport procedure based on timer information, aborting the NAS transport procedure, and releasing a PDU session.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a method for user equipment (UE) to communicate with a core network of a fifth generation (5G) system. The method can decide a UE mechanism or action when there is a non-access stratum (NAS) transport error in a core network of the 5G system, so that the UE can communicate effectively and efficiently with the core network, and the 5G system can improve its reliability and maintainability. The method can include transmitting a non-access stratum (NAS) transport message from the UE to the core network in order to initiate a NAS transport procedure with the core network, receiving an indication message from the core network when a network function of the core network is unable to process the NAS transport message, wherein the indication message can include at least one of a payload type, a cause value, and timer information, and performing, by the processing circuitry of the UE, at least one of: re-initiating a NAS transport procedure based on timer information, aborting the NAS transport procedure, and releasing a protocol data unit (PDU) session.

Figure 1:
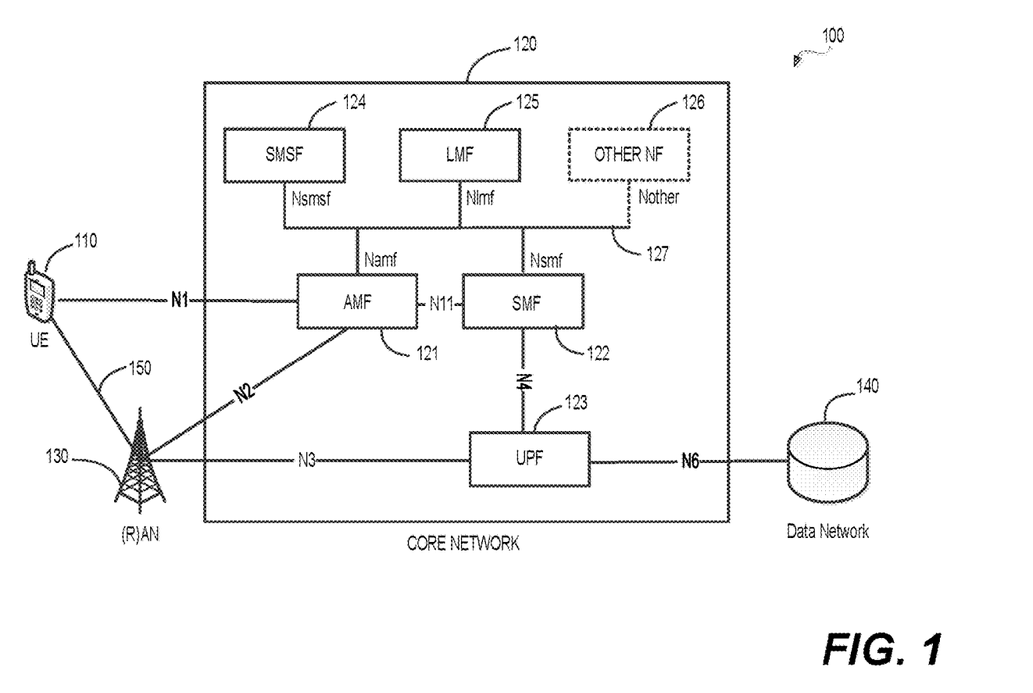
FIG. 1 shows a 5G system according to an exemplary embodiment of the disclosure.

FIG. 1 shows an exemplary 5G system 100 according to an embodiment of the disclosure. As shown, the system 100 can include a UE 110, a core network (CN), an (radio) access network ((R)AN) 130, and a data network (DN) 140.

The UE 110 can be any device or network element in the 5G system 100 capable of signal transmission and reception. For example, the UE 110 can be a mobile phone, a laptop computer, a tablet, a vehicle carried mobile communication device, a utility meter fixed at a certain location, a commercial product with wireline or wireless communication capability and the like. While only one UE 110 is depicted in FIG. 1, it should be understood that any number UEs 110 can be distributed in the 5G system 100.

The core network 120 can be a component in the 5G system 100 that provides service management and delivery over wireless, fixed, or converged networks. As shown, the core network 120 of the 5G system 100 uses a service-based architecture to support interactions between different network functions (NFs). The core network 120 can include multiple NFs, such as an Access and Mobility Management Function (AMF) 121, a Session Management Function (SMF) 122, a User Plane Function (UPF) 123, a Short Message Service Function (SMSF) 124, and a Location Management Function (LMF) 125. Of course, it should be understood that the core network 120 can include other NFs, as represented by other NF 126.

The 5G system 100 also allows a full control plane (CP) and user plane (UP) split in the core network 120 for independent scalability, evolution and flexible deployments. In the FIG. 1 example, the UP can include one or more UPFs 123 that support UP data processing. The CP functions can include the AMF 121, the SMF 122, the SMSF 124, the LMF 125, and the other NF 126. The AMF 121 can manage access control and mobility, and support other NFs to communicate with the UE 110 and the (R)AN 130, and the like. The SMF 122 can provide session management, IP address allocation and management, UP function selection and control, and the like. The SMSF 124 can manage the SMS subscription and delivery over the NAS and the like. The LMF 125 can support location measurement and determination for the UE 110, uplink location measurement from the (R)AN 130, and the like. These NFs can be connected to each other over their respective service-based interfaces (SBI) through a SBI message bus 127, as shown in FIG. 1. Particularly, Namf is the SBI exhibited by the AMF 121, Nsmf is the SBI exhibited by the SMF 122, Nsmsf is the SBI exhibited by the SMSF 124, and Nlmf is the SBI exhibited by the LMF 125. It should be understood that Nother can be any other SBI exhibited by any other NF 126 in the core network 120. The SBI message bus 127 can employ RESTful application program interface (API) principles over Hyper Text Transfer Protocol (HTTP) web technologies that dramatically simplify and accelerate service deployments.

Besides, each NF can interact with other NF by using a reference point. For example, the 5G system 100 contains the following reference points: N1 is the reference point between the UE 110 and the AMF 121, N2 is the reference point between the (R)AN 130 and the AMF 121, N3 is the reference point between the (R)AN 130 and the UPF 123, N4 is the reference point between the SMF 122 and the UPF 123, N6 is the reference point between the UPF 123 and the DN 140, and N11 is the reference point between the AMF 121 and the SMF 122. It should be understood that other reference points that show the interactions between NFs can also exist, but are not shown in FIG. 1, such as the reference point between the AMF 121 and the SMSF 124.

As defined in the 3GPP standard, SBIs and reference points are two different ways to represent the interactions between different NFs. A reference point is a conceptual point exists between two NFs and it can be replaced by the SBIs of these two NFs. For example, the reference point N11 between the AMF 121 and the SMF 122 can be replaced by the SBIs of the AMF 121 and the SMF 122, i.e., Namf and Nsmf.

The (R)AN 130 is part of the 5G system 100 that implements access technologies. It resides between the UE 110 and provides connection with the core network 120. For wireless cellular communication system, the 5G system 100 can employ 5G technologies developed by the 3$^{rd}$ Generation Partnership Group (3GPP). Thus, the UE 110 can establish a 3GPP or a non-3GPP access link 150 to the (R)AN 130. Specifically, the 3GPP access is based on the radio access technology specified by 3GPP, such as 5G New Radio (NR). The non-3GPP access is based on the access technologies that are not specified by 3GPP, such as Wireless Fidelity (Wi-Fi) and Bluetooth. The (R)AN 130 can connect to the AMF 121 and the UPF 123 of the core network 120 through the reference point N2 and N3, respectively.

The DN 140 is a digital network that can provide different Internet services and applications to the UE 110 through one or more protocol data unit (PDU) session(s). Herein, the PDU session can be created, updated, and removed by the core network 120. The Internet services and applications can be access to World Wide Web (WWW), digital video, digital audio, cloud storage and server, the use of email and instant message (IM) applications, and the like.

In operation, the UE 110 performs a non-access stratum (NAS) procedure for communicating with the core network 120, through the reference point N1. The purpose of the NAS transport procedure is to provide a transport of payload between the UE 110 and the AMF 121 of the core network 120. The payload types of the NAS transport message can be a 5G system session management (5GSM) message, a short message service (SMS) message, a long term evolution (LTE) positioning protocol (LPP) message, and the like. The payload messages can be encapsulated into a 5G system mobility management (5GMM) message that is transmitted to the AMF 121 of the core network 120 across the reference point N1. The AMF 121 receives the 5GMM message from the UE 110 and forwards the encapsulated payload, such as the 5GSM message, the SMS message, the LPP message, and the like towards corresponding NFs, such as the SMF 122, the SMSF 124, the LMF 125, and the other NF 126, respectively.

When the AMF 121 successfully processes the NAS transport message by forwarding the encapsulated 5GSM message, SMS message, LPP message, and the like towards the SMF 122, SMSF 124, LMF 125, and other NF 126, respectively. The corresponding NF can further process the request included in the received message, and send back a response message to the UE 120 through the AMF 121 across the reference point N1 in a reversed direction.

For example, the UE 110 can include a PDU session establishment request in a 5GSM message. The 5GSM message is then encapsulated into a 5GMM message and transmitted to the AMF 121 in a NAS transport procedure across the reference point N1. The AMF 121 can forward the 5GSM message to the SMF 122 across the reference point N11. The SMF 122 can process the PDU session establishment request that is included in the 5GSM message by interacting with the UPF 123 across the reference point N4 to establish the PDU session between the UE 110 and the DN 140.

When the AMF 121 is unable to process the NAS transport message by forwarding the encapsulated 5GSM message, SMS message, LPP message, and the like towards the SMF 122, the SMSF 124, the LMF 125, and the other NF 126, respectively, the AMF 121 can send an indication message to the UE 110 to inform the error.

For example, when the AMF 121 is unable to forward the 5GSM message towards the SMF 122 due to reason that the SMF 122 is busy and performing congestion control, the AMF 121 can send an indication message back to the UE 110 across the reference point N1. The indication message can include a payload type 5GSM, a cause value with a cause code #22 corresponding to "congestion", #67 corresponding to "insufficient resources for specific slice and data network name", or #69 corresponding to "insufficient resources for specific slice", and timer information. The cause value can carry the reason/cause information to notify the UE 110 which kind of congestion control mechanism is performed by the SMF 122. The timer information can carry the timer type (e.g., back-off timer or re-attempt timer) and timer value for the UE 110. The timer can be indicated from the core network signaling, a default timer, or a standardized timer. Then, when appropriate, the UE 110 can run the timer and re-initiate a NAS transport procedure when the timer expires.

In other examples, the AMF 121 may be unable to forward the 5GSM message towards the SMF 122 due to reason that the number of PDU sessions reaches the maximum number. The AMF 121 can send an indication message back to the UE 110 across the reference point N1. For example, the indication message can include a payload type 5GSM, a cause value with a cause code #65 corresponding to "maximum number of PDU sessions reached", and a back-off timer with a specific timer value. The timer can be indicated from the core network signaling, a default timer, or a standardized timer. Then, when appropriate, the UE 110 can release an existing PDU session, run the back-off timer and re-establish a new PDU session when the back-off timer expires.

Alternatively, the UE 110 can re-establish a new PDU after the UE 110 is switched off, after the UE's universal subscriber identity module (USIM) is removed, or after the UE 110 registers to a new public land mobile network (PLMN).

In an alternative example, if the AMF 121 is unable to forward the 5GSM message towards the SMF 122 due to some other reasons and the error can be permanent. The AMF 121 can send an indication message back to the UE 110 across the reference point N1. For example, the indication message can include a payload type 5GSM, a cause value with a cause code #90 corresponding to "payload was not forwarded", #91 corresponding to "Data Network Name (DNN) not supported or not subscribed in the slice", or #28 corresponding to "restricted service area", and timer information. The timer can be indicated from the core network signaling, a default timer, or a standardized timer. Then, when appropriate, the UE 110 can terminate the current NAS transport procedure after a timer expires, after the UE is switched off, after the UE's USIM is removed, or after the UE registers to a new PLMN.

Figure 2:
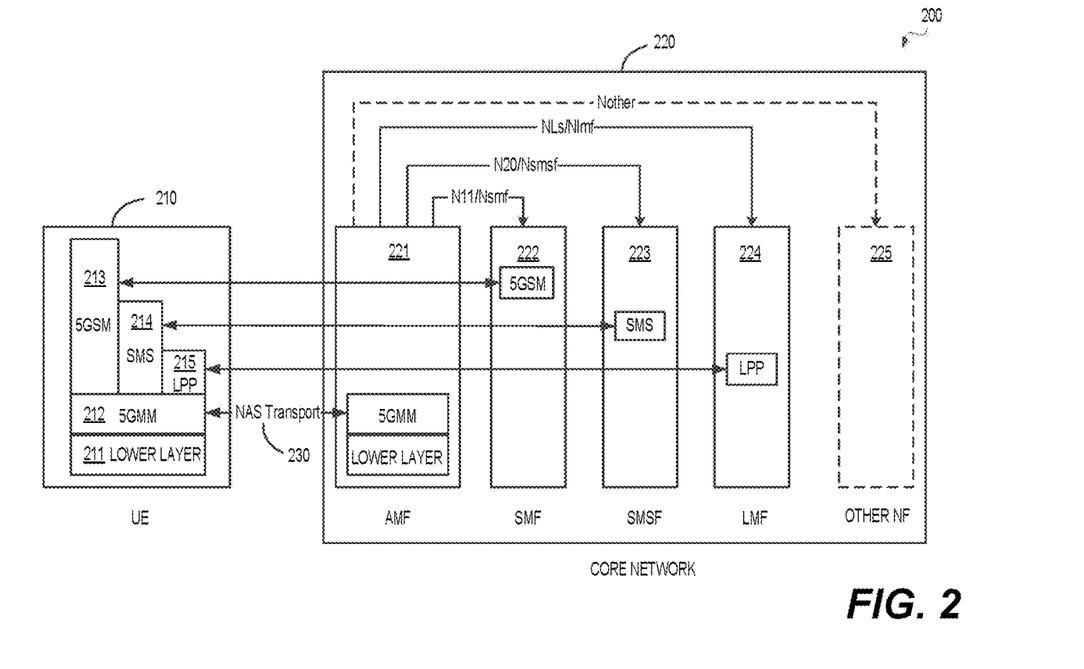
FIG. 2 shows an exemplary block diagram of NAS transport procedures according to an embodiment of the disclosure.

FIG. 2 shows an exemplary block diagram 200 of NAS transport procedures according to an embodiment of the disclosure. The UE 210 can establish a NAS transport connection 230 with the AMF 221 of the core network 220 over the reference point N1 that is illustrated in FIG. 1. The UE 210 can further use the NAS transport connection 230 to establish the NAS transport procedure between the UE 210 and a core network 220 network function (excluding the AMF 221). The network function in the core network 220 can be a SMF 222, a SMSF 223, a LMF 224 and any other NF 225.

In the FIG. 2 example, the UE 210 can initiate a NAS transport procedure by transmitting an uplink (UL) NAS transport message that terminates at the AMF 221 over the NAS transport connection 230. The payload type of the UL NAS transport message can be a 5GMM message 212. The UE 210 can also transmit the other NAS transport message with a different payload type that does not terminate at the AMF 221, together with the 5GMM message over the NAS transport connection 230 by AMF 221. When the AMF 221 receives the NAS transport message and detects the payload that does not terminate at the AMF 221, the AMF 221 can forward the payload towards the corresponding NF through the reference point between the AMF 221 and the NF.

For example, the UE 210 can transmit a 5GSM message 213 together with the 5GMM message 212 over the NAS transport connection 230. Because the 5GSM message 213 does not terminate at the AMF 221, then the AMF 221 can forward the 5GSM message 213 towards the SMF 222 through the reference point N11, or the SBI Nsmf, equivalently. Similarly, the UE 210 can transmit the SMS message 214 together with the 5GMM message 212 over the NAS transport connection 230. Because the SMS message 214 does not terminate at the AMF 221, then the AMF 221 can forward the SMS message 214 towards the SMSF 223 through the reference point N20, or the SBI Nsmsf, equivalently. The UE 210 can transmit the LPP message 215 together with the 5GMM message 212 over the NAS transport connection 230. Because the LPP message 215 does not terminate at the AMF 221, then the AMF 221 can forward the LPP message 215 towards the LMF 224 through the reference point NLs, or the SBI Nlmf, equivalently. Of course, it should be understood that the AMF 221 can forward the NAS message with any other type of payload towards any other NF 225 through the corresponding reference point Nother or the SBI Nother, equivalently.

When the AMF 221 is unable to process the NAS message, the AMF 221 can send back an indication message to the UE 210 through the NAS transport connection 230. The indication message can be a downlink (DL) NAS transport message, an uplink (UL) NAS transport unroutable indication, or a NAS transport reject. The indication message can include at least a payload type, a cause value, and timer information.

In some examples, when the AMF 221 is unable to forward the 5GSM 213 to the SMF 222, the AMF 221 can send a DL NAS transport message to the UE 210. The DL NAS transport message can include the payload type 5GSM 213, a 5GMM cause value, and the timer information. The 5GMM cause value can include at least one of the cause codes #65 corresponding to "maximum number of PDU sessions reached", #90 corresponding to "payload was not forwarded", #22 corresponding to "congestion", #67 corresponding to "insufficient resources for specific slice and data network name", #69 corresponding to "insufficient resources for specific slice", #91 corresponding to "DNN not supported or not subscribed in the slice", #28 corresponding to "restricted service area", and the like. The timer information can include a timer type, i.e., back-off timer or re-attempt timer, and a timer value. The timer can be indicated from the core network signaling, a default timer, or a standardized timer.

When the cause code is #22 corresponding to "congestion", #67 corresponding to "insufficient resources for specific slice and data network name", or #69 corresponding to "insufficient resources for specific slice", the UE 210 can temporarily stop sending 5GSM message through the NAS transport procedure, until the timer expires. After the timer expires, the UE 210 can re-initiate the same 5GSM message transport procedure.

When the cause code is #65 corresponding to "maximum number of PDU sessions reached", the UE 210 can release an existing PDU session and optimally re-establish a new PDU session when the timer expires.

Alternatively, the UE 210 can re-establish a new PDU after the UE 210 is switched off, after the UE's universal subscriber identity module (USIM) is removed, or after the UE 210 registers to a new public land mobile network (PLMN).

When the cause code is #90 corresponding to "payload was not forwarded", #91 corresponding to "DNN not supported or not subscribed in the slice", or #28 corresponding to "restricted service area", the UE 210 can terminate the NAS transport procedure after a timer expires, after the UE 210 is switched off, after the UE's universal subscriber identity module (USIM) is removed, or after the UE 210 registers to a new public land mobile network (PLMN).

In other examples, when the AMF 221 is unable to forward the SMS 214 to the SMSF 223, or the LPP 215 to the LMF 224, the AMF 221 can send a DL NAS transport message including a payload type SMS 214 or LPP 215, a 5GMM cause value, and timer information to the UE 210. Herein, the 5GMM cause value can include the cause code #90 corresponding to "payload was not forwarded", #22 corresponding to "congestion", #67 corresponding to "insufficient resources for specific slice and data network name", #69 corresponding to "insufficient resources for specific slice", #91 corresponding to "DNN not supported or not subscribed in the slice", #28 corresponding to "restricted service area", and the like. The timer information can include the timer type, i.e., back-off timer or re-attempt timer, and the timer value. The timer can be indicated from the core network signaling, a default timer, or a standardized timer.

When the cause code is #22 corresponding to "congestion", #67 corresponding to "insufficient resources for specific slice and data network name", or #69 corresponding to "insufficient resources for specific slice", the UE 210 can temporarily stop sending SMS and LPP message through the NAS transport procedure, until the timer expires. After the timer expires, the UE 210 can re-initiate the same SMS or LPP message transport procedure.

When the cause code is #90 corresponding to "payload was not forwarded", #91 corresponding to "DNN not supported or not subscribed in the slice", or #28 corresponding to "restricted service area", the UE 210 can terminate the current SMS or LPP message transport procedure after a timer expires, after the UE 210 is switched off, after the UE's universal subscriber identity module (USIM) is removed, or after the UE 210 registers to a new public land mobile network (PLMN).

Figure 3:
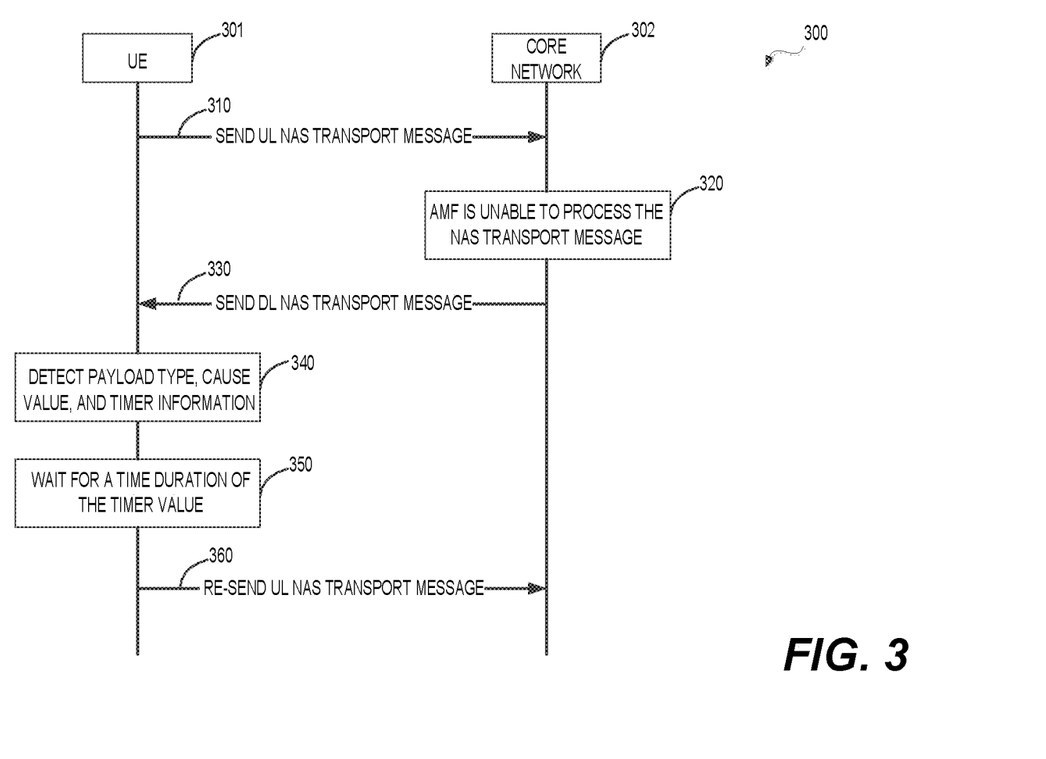
FIG. 3 is a flowchart showing an exemplary process where the UE runs a timer and re-initiates a NAS transport procedure according to an embodiment of the disclosure.

FIG. 3 is a flowchart showing an exemplary process 300 where a UE 301 runs a timer and re-initiates a NAS transport procedure according to an embodiment of the disclosure. The procedure 300 can start from 310.

At 310, the UE 301 sends a UL NAS transport message to the AMF of the core network 302 through the reference point N1 that is illustrated in FIG. 1. The UL NAS transport message can include a payload type of 5GSM, SMS, or LPP. Then the process can proceed to 320.

At 320, upon reception of the UL NAS transport message from the UE 301, the AMF of the core network 302 may be unable to process the NAS transport message. For example, the AMF of the core network 302 may be unable to forward the 5GSM towards the SMF due to the SMF is busy and running a congestion control mechanism, or the number of PDU sessions achieves the maximum number. In other examples, the AMF of the core network 302 may be unable to forward the SMS towards the SMSF, or the AMF of the core network 302 may be unable to forward the LPP towards the LMF. Then the process can proceed to 330.

At 330, the AMF of the core network 302 can send back an indication message including a payload type, a cause value and timer information, to the UE 301 through the reference point N1 that is illustrated in FIG. 1. The indication message can be a DL NAS transport message, a UL NAS transport unroutable indication, or a NAS transport reject message. For example, when the AMF of the core network 302 is unable to forward the 5GSM towards the SMF, the AMF of the core network 302 can send a DL NAS transport message back to the UE 301 through the reference point N1 that is illustrated in FIG. 1. The DL NAS transport message can include the payload type 5GSM, a cause value including a cause code #22 corresponding to "congestion", #67 corresponding to "insufficient resources for specific slice and data network name", or #69 corresponding to "insufficient resources for specific slice", and timer information including a timer type and a timer value.

Similarly, when the AMF of the core network 302 is unable to forward the SMS towards the SMSF, the AMF of the core network 302 can send a DL NAS transport message including the payload type SMS, a cause value, and timer information back to the UE 301 through the reference point N1 that is illustrated in FIG. 1. When the AMF of the core network 302 is unable to forward the LPP towards the SMF, the AMF of the core network 302 can send a DL NAS transport message including the payload type LPP, a cause value, and timer information back to the UE 301 through the reference point N1 that is illustrated in FIG. 1. Then the process can proceed to 340.

At 340, upon reception of the indication message (i.e., DL NAS transport message) from the AMF of the core network 302, the UE 301 can detect the payload type, the cause value, and the timer information. The payload type can be 5GSM, SMS, or LPP. The cause value included in the indication message can provide the reason why the core network 302 is unable to process the NAS transport message. In the FIG. 3 example, the cause value can be the cause code #22 corresponding to "congestion", #67 corresponding to "insufficient resources for specific slice and data network name", or #69 corresponding to "insufficient resources for specific slice". The timer information can include a timer type and a timer value, wherein the timer type can be either a back-off timer or a re-attempt timer. The timer can be indicated from the core network signaling, a default timer, or a standardized timer. Then the process can proceed to 350.

At 350, the UE 301 can run the timer that is configured by the timer information. For example, the UE 301 can run a back-off timer and wait for a time duration that is defined by the timer value. When the back-off timer is running, the UE 301 can stop sending the NAS transport message to the core network 302. Then the process can proceed to 360.

At 360, the UE 301 can re-initiate the same NAS transport procedure by re-sending a UL NAS transport message when the back-off timer expires. If the AMF of the core network 302 is not able to process the message in this next attempt, then the procedure 300 can be repeated.

Figure 4:
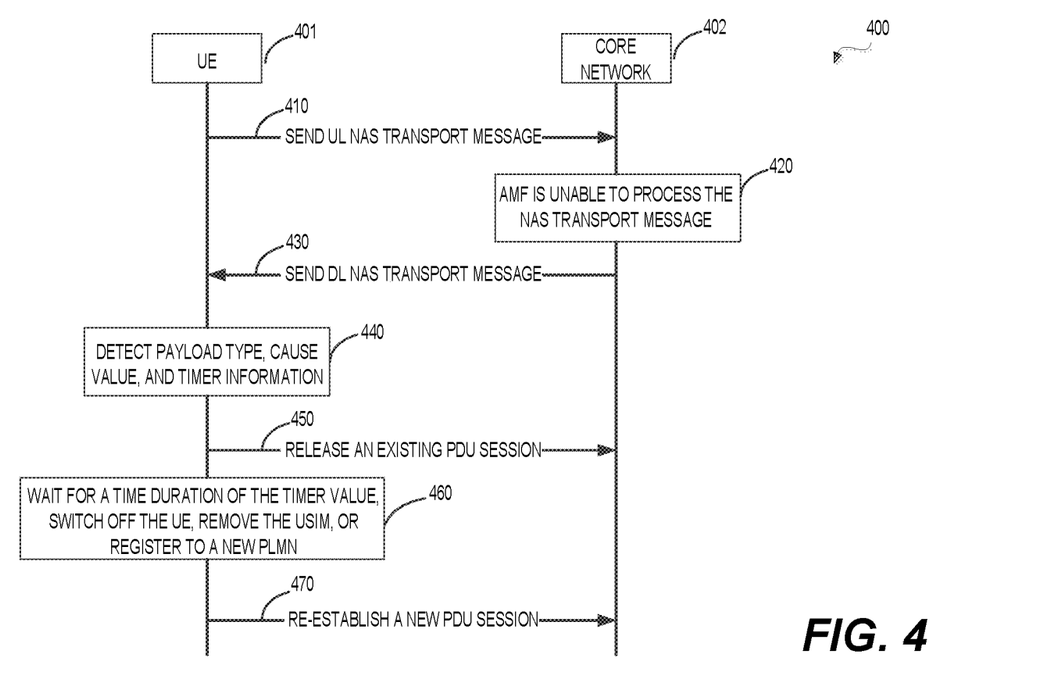
FIG. 4 is a flowchart showing an exemplary process where the UE releases the PDU session according to an embodiment of the disclosure.

FIG. 4 is a flowchart showing an exemplary process 400 where a UE 401 releases a PDU session according to an embodiment of the disclosure. The procedure 400 can start from 410.

At 410, the UE 401 sends a UL NAS transport message to the AMF of the core network 402 through the reference point N1 that is illustrated in FIG. 1. The UL NAS transport message may include a payload type of 5GSM with a PDU session establishment request intended for the SMF. Then the process can proceed to 420.

At 420, upon reception of the UL NAS transport message from the UE 401, the AMF of the core network 402 may be unable to process the NAS transport message. For example, the AMF of the core network 402 may be unable to forward the 5GSM towards the SMF due to the reason that SMF is running a congestion control mechanism, or the number of PDU sessions reaches the maximum number. Then the process can proceed to 430.

At 430, the AMF of the core network 402 can send back an indication message including a payload type, a cause value, and timer information, to the UE 401 through the reference point N1 that is illustrated in FIG. 1. The indication message can be a DL NAS transport message, a UL NAS transport unroutable indication, or a NAS transport reject message. In the FIG. 4 example, the AMF of the core network 402 can send a DL NAS transport message back to the UE 401 through the reference point N1 that is illustrated in FIG. 1. For example, the DL NAS transport message can include the payload type 5GSM, a cause value including a cause code #65 corresponding to "maximum number of PDU sessions reached", and timer information. Then the process can proceed to 440.

At 440, upon reception of the indication message (i.e., DL NAS transport message) from the AMF of the core network 402, the UE 401 can detect the payload type, the cause value, and the timer information. In the FIG. 4 example, the payload type is 5GSM. For example, the cause value can be the cause code #65 corresponding to "maximum number of PDU sessions reached". The timer information can include a timer type and a timer value, wherein the timer type can be either a back-off timer or a re-attempt timer. The timer can be indicated from the core network signaling, a default timer, or a standardized timer. Then the process can proceed to 450.

At 450, the UE 401 can release an existing PDU session and notify the core network 402 of the release. Depending on the indication message that is received from the core network 402, the procedure 400 can optionally proceed to 460.

At 460, the UE 401 can run a timer that is configured by the timer information in the indication message. For example, the UE 401 can run a timer and wait for a time duration that is defined by the timer value. When the timer is running, the UE 401 can temporarily stop communicating with the core network 402. Alternatively, the UE 401 can switch off, remove the USIM, or register to a new PLMN. Then the process can proceed to 470.

At 470, the UE 401 can re-establish a new PDU session by re-sending a UL NAS transport message after the timer expires, after the UE 401 is switched off, after the UE's USIM is removed, or after the UE 401 registers to a new PLMN. The PDU session re-establishment request can be included in the UL NAS transport message. If the AMF of the core network 402 is not able to process the message in this next attempt, then the procedure 400 can be repeated.

Figure 5:
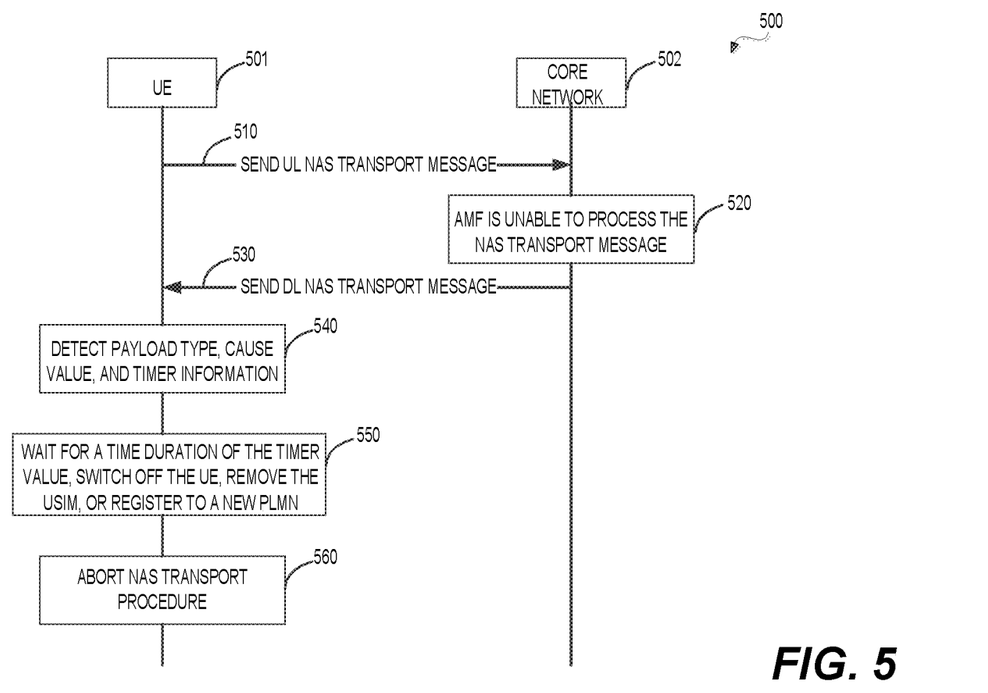
FIG. 5 is a flowchart showing an exemplary process where the UE aborts the NAS transport procedure according to an embodiment of the disclosure.

FIG. 5 is a flowchart showing an exemplary process 500 where a UE 501 aborts a NAS transport procedure according to an embodiment of the disclosure. The procedure 500 can start from 510.

At 510, the UE 501 sends a UL NAS transport message to the AMF of the core network 502 through the reference point N1 that is illustrated in FIG. 1. The UL NAS transport message can include a payload type of 5GSM, SMS, or LPP. Then the process can proceed to 520.

At 520, upon reception of the UL NAS transport message from the UE 501, the AMF of the core network 502 may be unable to process the NAS transport message. For example, the AMF of the core network 502 may be unable to forward the 5GSM towards the SMF due to the reason that the SMF is offline or under maintenance. In other examples, the AMF of the core network 502 may be unable to forward the SMS towards the SMSF, or the AMF of the core network 502 may be unable to forward LPP towards the LMF. Then the process can proceed to 530.

At 530, the AMF of the core network 502 can send back an indication message including a payload type, a cause value, and optionally timer information to the UE 501 through the reference point N1 that is illustrated in FIG. 1. The indication message can be a DL NAS transport message, a UL NAS transport unroutable indication, or a NAS transport reject message. In the FIG. 5 example, the AMF of the core network 502 can send a DL NAS transport message back to the UE 501 through the reference point N1 that is illustrated in FIG. 1. The DL NAS transport message can include the payload type 5GSM, a cause value including a cause code #90 corresponding to "payload was not forwarded", #91 corresponding to "DNN not supported or not subscribed in the slice", or #28 corresponding to "restricted service area", and timer information. Then the process can proceed to 540.

At 540, upon reception of the indication message (i.e., DL NAS transport message) from the AMF of the core network 502, the UE 501 can detect the payload type, the cause value and the timer information. In the FIG. 5 example, the payload type is 5GSM. The cause value can be the cause code #90 corresponding to "payload was not forwarded", #91 corresponding to "DNN not supported or not subscribed in the slice", or #28 corresponding to "restricted service area". The timer can be indicated from the core network signaling, a default timer, or a standardized timer. Then the process can proceed to 550.

At 550, the UE 501 can run a timer that is configured by the timer information in the indication message. For example, the UE 501 can run a timer and wait for a time duration that is defined by the timer value. Alternatively, the UE 501 can switch off, remove the USIM, or register to a new PLMN. Then the process can proceed to 560.

At 560, the UE 501 can abort the NAS transport procedure. For example, the UE 501 can terminate the UL NAS transport procedure between the UE 501 and the core network 502 after the timer expires, after the UE 501 is switched off, after the UE's USIM is removed, or after the UE 501 registers to a new PLMN.

Figure 6:
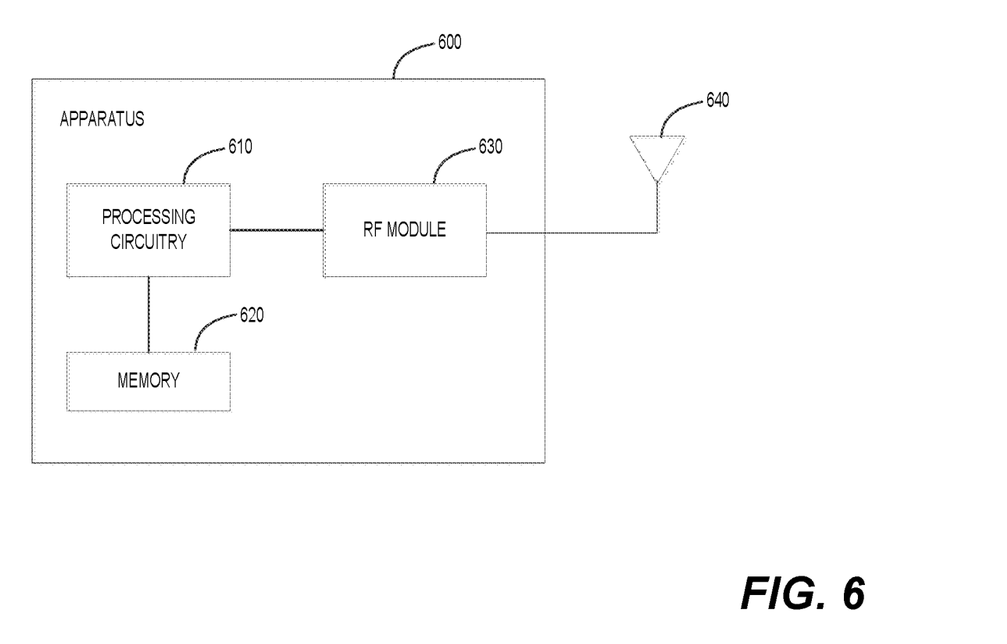
FIG. 6 shows an exemplary block diagram of a UE according to an embodiment of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of techniques, processes, functions, components, systems described herein. For example, the apparatus 600 can be used to implement functions of the UE 110 in various embodiments and examples described herein. The apparatus 600 can be a general purpose computer in some embodiments, and can be a device including specially designed circuits to implement various functions, components, or processes described herein in other embodiments. The apparatus 600 can include processing circuitry 610, a memory 620, a radio frequency (RF) module 630, and an antenna 640.

In various examples, the processing circuitry 610 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory can include transitory or non-transitory storage medium. The memory 620 can include a read only memory (ROM), a random access memory (RAM), a flash memory, a solid state memory, a hard disk drive, an optical disk drive, and the like.

The RF module 630 receives processed data signal from the processing circuitry 610 and transmits the signal in a beam-formed wireless communication network via an antenna 640, or vice versa. The RF module 630 can include a digital to analog convertor (DAC), an analog to digital converter (ADC), a frequency up convertor, a frequency down converter, filters, and amplifiers for reception and transmission operations. The RF module 1230 can include multi-antenna circuitry (e.g., analog signal phase/amplitude control units) for beamforming operations. The antenna 640 can include one or more antenna arrays.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of communicating with a core network, comprising:
   transmitting, by processing circuitry of a user equipment (UE), a non-access stratum (NAS) transport message to the core network to initiate a NAS transport procedure with the core network;
   receiving an indication message from the core network that is indicative of one of network functions of the core network being unable to process the NAS transport message, the indication message including at least one of a payload type, a cause value, and timer information; and
   performing, in response to the indication message by the processing circuitry of the UE, at least one of:
      re-initiating the NAS transport procedure based on the timer information;
      aborting the NAS transport procedure; and
      releasing a protocol data unit (PDU) session.

2. The method of claim 1, wherein the NAS transport message includes at least one of:
   a fifth generation system session management (5GSM) message;
   a short message service (SMS) message; and
   a long term evolution (LTE) positioning protocol (LPP) message.

3. The method of claim 1, wherein the network functions of the core network include one or more of:
   an Access and Mobility Management function (AMF) of the core network;
   a Session Management Function (SMF) of the core network;
   a short message service (SMS) Function (SMSF) of the core network; and
   a Location Management Function (LMF) of the core network.

4. The method of claim 3, wherein
   the one of the network functions of the core network is the AMF, and
   the one of the network functions of the core network is unable to process the NAS transport message when the AMF of the core network is unable to:
      transmit a fifth generation system session management (5GSM) message to the SMF of the core network;
      transmit a short message service (SMS) message to the SMSF of the core network; or
      transmit a long term evolution (LTE) positioning protocol (LPP) message to the LMF of the core network.

5. The method of claim 1, wherein the re-initiating the NAS transport procedure is performed further based on a timer that is:
   indicated via signaling from the core network;
   a default timer; or
   a standardized timer.

6. The method of claim 1, further comprising, after the PDU session is released, re-establishing a new PDU session after:
   a timer expires;
   the UE is switched off;
   the UE's universal subscriber identity module (USIM) is removed; or
   the UE registers to a new public land mobile network (PLMN).

7. The method of claim 1, wherein the aborting the NAS transport procedure comprises terminating a current fifth generation system session management (5GSM), short message service (SMS), or long term evolution (LTE) positioning protocol (LPP) message transport procedure after:
   a timer expires;
   the UE is switched off;
   the UE's universal subscriber identity module (USIM) is removed; or
   the UE registers to a new public land mobile network (PLMN).

8. The method of claim 1, wherein the timer information includes a timer type and a timer value, and the timer type includes at least one of a re-attempt timer and a back-off timer.

9. The method of claim 1, wherein the cause value is selected from fifth generation system mobility management (5GMM) cause codes that include:
   65 corresponding to "maximum number of PDU sessions reached";
   90 corresponding to "payload was not forwarded";
   22 corresponding to "congestion";
   67 corresponding to "insufficient resources for specific slice and data network name";
   69 corresponding to "insufficient resources for specific slice";
   91 corresponding to "Data Network Name (DIN) not supported or not subscribed in the slice"; and
   28 corresponding to "restricted service area".

10. A user equipment for communicating with a core network, comprising:
    a transceiver configured to communicate with the core network; and
    processing circuitry that is configured to:
       transmit via the transceiver a non-access stratum (NAS) transport message to the core network to initiate a NAS transport procedure with the core network;
       receive an indication message from the core network that is indicative of one of network functions of the core network being unable to process the NAS transport message, the indication message including at least one of a payload type, a cause value, and timer information; and
    perform, in response to the indication message, at least one of:

re-initiating the NAS transport procedure based on the timer information;
aborting the NAS transport procedure; and
releasing a protocol data unit (PDU) session.

11. The user equipment of claim 10, wherein the NAS transport message includes at least one of:
a fifth generation system session management (5GSM) message;
a short message service (SMS) message; and
a long term evolution (LTE) positioning protocol (LPP) message.

12. The user equipment of claim 10, wherein the processing circuitry is configured to perform the re-initiating the NAS transport procedure further based on a timer that is:
indicated via signaling from the core network;
a default timer; or
a standardized timer.

13. The user equipment of claim 10, wherein the processing circuitry is configured to, after the PDU session is released, re-establish a new PDU session after:
a timer expires;
the user equipment (UE) is switched off;
the UE's universal subscriber identity module (USIM) is removed; or
the UE registers to a new public land mobile network (PLMN).

14. The user equipment of claim 10, wherein the processing circuitry is configured to, for the aborting the NAS transport procedure, terminate a current fifth generation system session management (5GSM), short message service (SMS), or long term evolution (LTE) positioning protocol (LPP) message transport procedure after:
a timer expires;
the user equipment (UE) is switched off;
the UE's universal subscriber identity module (USIM) is removed; or
the UE registers to a new public land mobile network (PLMN).

15. The user equipment of claim 10, wherein the timer information includes a timer type and a timer value, and the timer type includes at least one of a re-attempt timer and a back-off timer.

16. The user equipment of claim 10, wherein the cause value is selected from fifth generation system mobility management (5GMM) cause codes that include:
65 corresponding to "maximum number of PDU sessions reached";
90 corresponding to "payload was not forwarded";
22 corresponding to "congestion";
67 corresponding to "insufficient resources for specific slice and data network name"; and
69 corresponding to "insufficient resources for specific slice";
91 corresponding to "Data Network Name (DNN) not supported or not subscribed in the slice"; and
28 corresponding to "restricted service area".

17. A non-transitory computer readable medium storing instructions which, when executed by a processor of a user equipment (UE), cause the processor to perform a method comprising:
transmitting a non-access stratum (NAS) transport message to a core network to initiate a NAS transport procedure with the core network;
receiving an indication message from the core network that is indicative of one of network functions of the core network being unable to process the NAS transport message, the indication message including at least one of a payload type, a cause value, and timer information; and
performing, in response to the indication message, at least one of:
re-initiating the NAS transport procedure based on the timer information;
aborting the NAS transport procedure; and
releasing a protocol data unit (PDU) session.

\* \* \* \* \*